United States Patent [19]

Pritchard et al.

[11] Patent Number: 4,789,125
[45] Date of Patent: Dec. 6, 1988

[54] LINEAR MOVING CARRIAGE

[76] Inventors: James A. Pritchard; Anton E. Pritchard, both of 52 Needham St., P.O.B. 17, Norfolk, Mass. 02056

[21] Appl. No.: 940,749

[22] Filed: Dec. 11, 1986

[51] Int. Cl.⁴ .......................... F16C 1/00; F16M 1/00; G02B 7/18; G01B 9/02
[52] U.S. Cl. .................... 248/479; 248/486; 248/276; 248/277; 350/632; 350/633; 414/917
[58] Field of Search .............. 350/633, 632, 639, 604; 248/479, 480, 486, 274, 276, 277, 284, 291, 293, 298; 414/917, 751

[56] References Cited

U.S. PATENT DOCUMENTS

| | | | |
|---|---|---|---|
| 419,549 | 1/1890 | Parker | 248/486 |
| 1,444,549 | 2/1923 | Frazin | 248/477 |
| 1,969,415 | 8/1934 | Ostroff | 248/277 |
| 3,291,431 | 12/1966 | Daniel | 74/103 |
| 3,426,994 | 2/1969 | Daniel | 248/477 |
| 3,501,120 | 3/1970 | Daniel | 74/103 |
| 3,784,674 | 1/1974 | Smith | 248/284 |
| 4,003,536 | 1/1977 | Sekerich | 248/485 |
| 4,054,185 | 10/1977 | Stedman | 414/917 |
| 4,345,864 | 8/1982 | Smith et al. | 414/917 |
| 4,548,544 | 10/1985 | Van Appledorn | 414/751 |

FOREIGN PATENT DOCUMENTS 166440  3/1934  Switzerland ..................... 248/486

Primary Examiner—Jon W. Henry
Attorney, Agent, or Firm—John E. Toupal; Harold G. Jarcho

[57] ABSTRACT

A pivoting, compensating parallelogram linkage system converts rotary motion into axial linear motion of a portion thereof suited for critical uses such as carriage of a moving mirror in a Michelson interferometer. The compensating includes a coupling provision that in response to angle change in one part of the linkage imposes an equal but opposite angle change in another part of the linkage. The coupling may include a motor to reciprocate the portion usable as a carriage.

2 Claims, 8 Drawing Sheets (OLD ART)

(OLD ART)

(OLD ART)

(OLD ART)

LINEAR MOVING CARRIAGE

FIELD OF THE INVENTION

This invention relates generally to a four bar system for linear moving carriage systems and specifically to those requiring high precision movement, frequently under automatic control, such as in Michelson interferometers.

SUMMARY OF THE INVENTION

In brief summary given as cursive description only and not as limitation, the invention teaches a system for moving a carriage along a straight line through the use of two pivot parallelograms mounted together.

Further objects of the invention are to provide a system as described that employs few and simple parts, easily made and assembled, that is precise, durable and reliable, and that can be embodied in a variety of configurations, including at least one that provides as a feature exceptionally low backlash.

BRIEF DESCRIPTION OF THE DRAWINGS

The above and other objects and advantages of this invention will become more readily apparent on examination of the following description, including the drawings in which like rereference numerals refer to like parts.

DETAILED DESCRIPTION, OLD ART

Figure 1A:
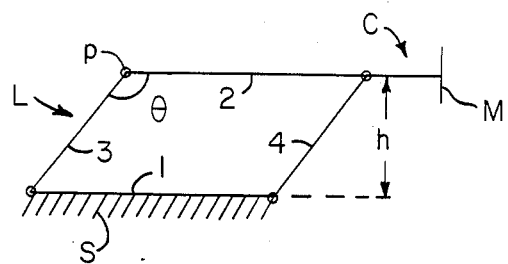
FIGS. 1a, 1b and 1c diagram in side elvational view geometric principles of operation of an old art pivot carriage.
Figure 1B:
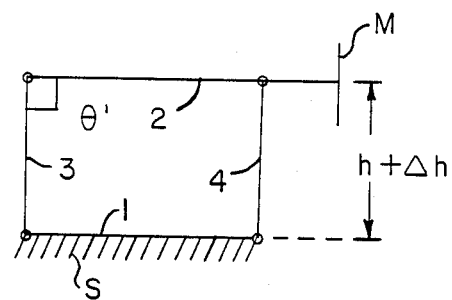
Figure 1C:
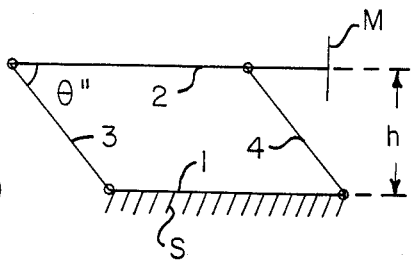

FIGS. 1a, 1b and 1c, old art, show that a pivot carriage as a type may be, for example, a mirror mounting carriage C that when driven reciprocates in a plane, through deformation of a hinge type pivoted parallelogram linkage L that guides and supports it. The sides or bars 1, 2, 3, 4 of the parallelogram are rigid.

Side 1 may also be a support S, or fixed to a support S. Pivoting may be accomplished by means of simple hinges, diagrammed at p, at the vertices (or similarly by means of crossed-spring type conventional flex-joints or by ball bearings joints or other equivalent, known means).

The carriage may be driven by torquemotor or other known means. As angle $\theta$ is varied from first obtuse, then right, then acute, the surface M, which may, as noted, represent a mirror surface, is translated through a distance or stroke in a plane perpendicular to itself. However, it also is translated laterally through a displacement $\Delta h$ proportioned to the stroke, an unwanted motion and displacement.

Figure 2:
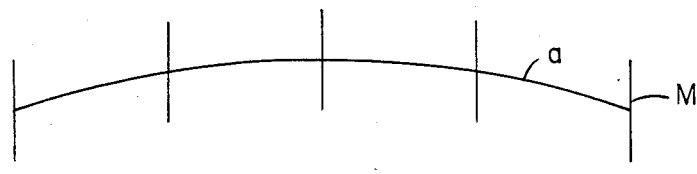
FIG. 2 diagrams in side elevational view stages of motion showing unwanted arcing motion of the old art pivot carriage.

FIG. 2 indicates also, in successive positions how surface M moves along an arc "a".

Therefore, although this known pivot carriage can in a cross-spring or sleeve bearing embodiment, for example, dispense with rolling or sliding elements and provide low friction and simplicity, the arcing motion of the carriage leaves this old art device at serious disadvantage to known systems such as slide carriages that translate the carriage along a straight line.

Figure 3:
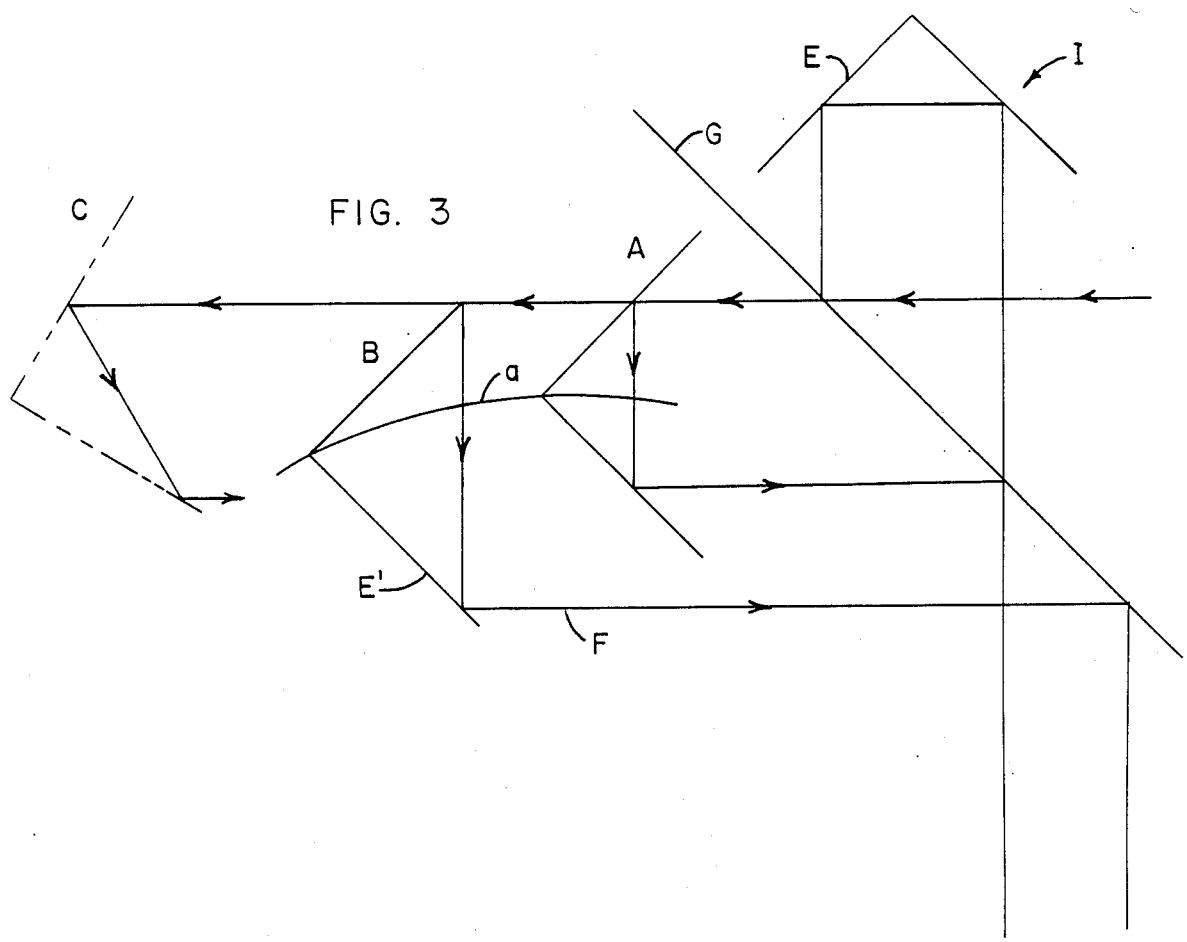
FIG. 3 is a diagram showing inapplicability of the old art pivot carriage to a conventional, optically tilt-compensated Michelson interferometer.

FIG. 3, also old art, shows that, for example, the old art arcuate travel of the mirror cannot be tolerated in a Michelson interferometer I that has optically tilt-compensated elements such as cat's eyes or corner cubes, one, E, of which is fixed and the other, E', of which is to be moved.

When the tilt compensated moving retro-reflector E' of the Michelson interferometer I is moved along an arc a from position A to position B instead of properly in a straight line, the exit beam is displaced laterally as shown, and does not recombine at the beamsplitter G to cause interference. This effect is known as shear. If, instead, the retro-reflector is moved linearly, as to position C, no such lateral diplacement, F, will occur, even if the reflector is tilted.

The present invention overcomes arcing limitations.

Figure 4A:
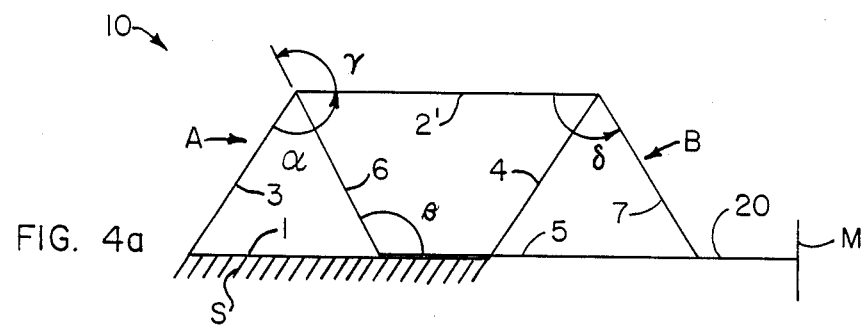
FIGS. 4a, 4b and 4c diagram, in what may be considered a side elevational view, geometric principles of the linear motion carriage of this invention in preferred embodiment.
Figure 4B:
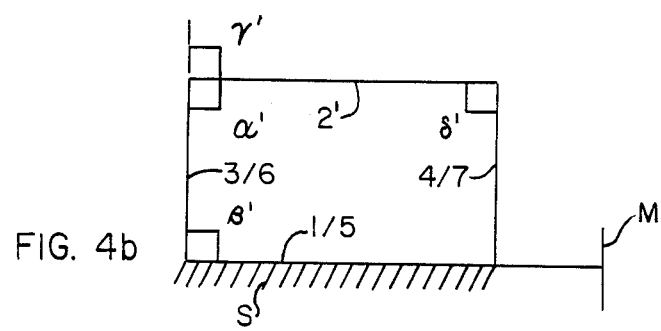
Figure 4C:
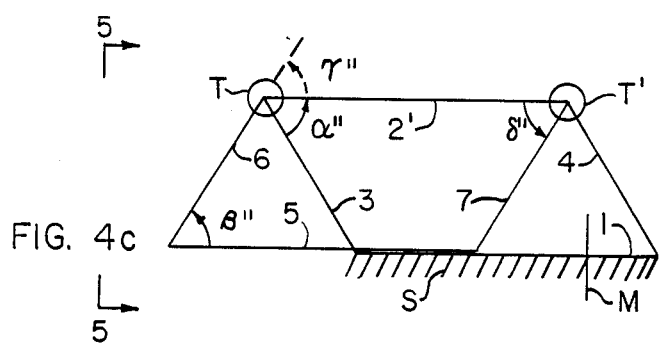

FIGS. 4a–4c show elements of preferred embodiment 10 of this invention, which includes a plurality of side defining means or rigid bars, each joined at each end by a respective hinge-type pivot to other bars, and further includes moving element M and carriage 20 holding M rigidly to a bar 5. The carriage or mount is to be considered a part of bar 5, or any rigid extension of bar 5.

Not shown, but indicated and described later, are the drive means, the angle dividing means and pivots, all conventional.

Function of the system is to produce a rectilinear movement of an element M, such as a moving mirror in a Michelson interferometer, using only pivots, no slides or linear rolling components.

Corresponding sides or bars 3, 4, 6 and 7 are equal in length and similarly bars 1, 2' and 5. Bar 1 is fixed to any convenient support S. If desired, the bar 1 may be omitted and just the pivot structure at 1, 3 and 1, 4 fixed to the mount S. The carriage system functions as angles $\alpha$ and $\beta$ are varied from being first obtuse, then right, then acute, with angle $\alpha$ kept equal to angle $\beta$. As indicated, flex pivot joints or circular rolling bearings, or other kinds of hinge mechanisms may be used at the vertices of both parallelograms, A and B. As angles $\alpha$ and $\beta$ are varied as described above, first obtuse, then right, then acute, surface M moves from right to left. The geometric principles of the parallelogram apply, and surface M is therefore constrained to parallel motion. Very importantly, since angles $\alpha$ and $\beta$ are equal angles, surface M moves along a line, not an arc, the line defined by rectilinear motion of side 5 along itself. No lateral motion of surface M occurs.

The question of maintaining $\alpha=\beta$ deserves some discussion. The condition of $\alpha=\beta$ holds whenever either $\alpha=\beta$ or $\alpha=\gamma$ or $\alpha=\delta$, the latter two conditions are proved with simple geometric arguments. There are several means of satisfying these conditions. For example, we may achieve $\alpha=\beta$ by using angle displacement transducers and a torque motor synchronized through conventional servo-techniques. The bar 5 and the mount or carriage 20 reciprocate axially, and, as will be seen, without touching the support. Any suitable support may be used, and any orientation, "up" and "down" concepts being used for exposition purposes.

Means for defining a first parallelogram A with sides angularly movable in-plane include a first primary side 1. As said, primary side 1 may be an actual bar or may be a support S, or both, the function being that of supporting both parallelograms, the carriage and necessary synchronizing apparatus. To the ends of this, generally upright third and fourth primary sides 3 and 4 are pivoted, at 3, 1 and 4,1. These, in turn, by pivots at 3,2' and 4,2' similarly join a second primary side 2'.

The second parallelogram B is offset transverse to the plane of the paper to prevent interference with the first parallelogram and the support.

Means for defining the second parallelogram B with sides angularly movable in-plane include a first secondary side 5, to the ends of which generally upright third, and fourth secondary sides 6 and 7 are pivoted at 6, 5 and 7, 5, and pivoted at 6, 2' and 7,2', attaching a upright sides 6, 7 to the ends of the second secondary side 2'.

In the simplest embodiment, shown, the second primary and secondary sides may be common to the first and second parallelogram as indicated by the single side 2'.

The two parallelograms described are the same size and are always congruent; however, they coincide perfectly one over the other only when aligned together at the right-angle position, as indicated below.

OPERATION

FIG. 4b shows the only position of perfect coincidence permitted in this invention, that at which the parallelograms are rectangles. This may be the midstroke position.

At all other stroke positions the angle of the substantially upright members, 3 and 4 of the first parallelogram with respect to the position of perfect coincidence shown, is maintained equal and opposite to the angle of the substantially upright members 6, 7 of the second parallelogram, as in FIGS. 4a and 4c.

As a result, when the first parallelogram rises or lowers in moving toward or away from the position of perfect coincidence, the second parallelogram rises or lowers an equal amount in the opposite direction, nullifying the rising and lowering of the first parallelogram, and increases or decreases in length the same amount and in the same direction as the first parallelogram, providing a doubling of the travel, in a rectilinear path.

As indicated, it will be evident that the support, as well as any side, may be a bar. Further, the two parallelograms do not need to have a common bar 2', each, for example, can have four bars, so long as the mechanism permits the operations described.

FIG. 4c additionally diagrams respective torquemotors T, T' at the pivots 3, 6, 2' and 4, 7, 2'.

Although reference may be made to torquemotors turning in opposite directions, it will be appreciated that any arrangement producing the same effect as, for example, torquemotors on opposite sides will fall within the invention.

Figure 5:
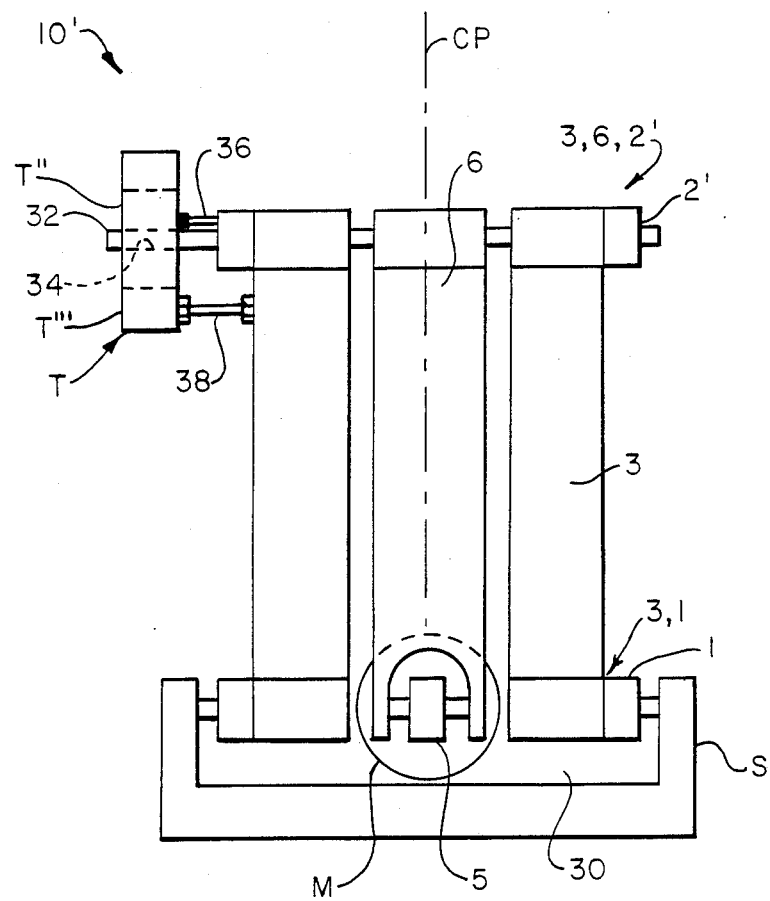
FIG. 5 is a rear elevational view of an embodiment of this invention.

FIG. 5 shows in end-view diagram one relation of positions of the parallelograms, adapted from 5—5, FIG. 4c, and indicates parts of one system for angle dividing, in embodiment 10.

A center plane passing through the system is indicated at CP. Either symmetrical half of the parallelogram could be considered as showing the elements discussed in FIG. 4, but for better balance, the whole system may be considered as doubled where shown.

Support S may have a "U"-shape to provide clearance 30 for bar 5, extensions of bar 5, through bar 6, and for bars 1, and 3 which are pivotally affixed to the support as by hinge joints at 3, 1 and 3, 6, 2'.

Horizontal bar 2' appears at the top where it is shown pivoted or hinged as by a pin 32 that passes through it and through the elements 3 and 6.

Diagrammed at the left is a conventional torquemotor T that may have an extension of pin 32 passing freely through central hole 34 in it for alignment purposes. The stator T" of the torquemotor is diagrammed as engaging a horizontal bar symmetrical counterpart to 2' by a stud 36. The stator T" of the torquemotor is diagrammed as engaging a horizontal bar symmetrical counterpart to 2' by a stud 36. The rotor T'" similarly is diagrammed as engaging a symmetrical counterpart of bar 3 by a stud 38.

The torque motor would be conveniently programmed to turn angle $\alpha$ in such a direction such that $\alpha$ tracks or follows $\delta$; this can be done with a conventional servo loop. Since, in this arrangement, parallelogram A is slaved to follow the activity of B, but B may move without influence from A, we shall refer to this servo system as a master/slave arrangement. It is clear that, from the point of view of the servo system, the choice of which parallelogram is to be master or slave is arbitrary, and furthermore, because of the geometric principles of the parallelogram, the torque motor may be placed at any vertex of the slave parallelogram which may be most convenient.

With the torque motor at 2', 3 as above, a similar torque motor installation could be provided at the juncture of sides 2', 4 and 7 (FIG. 4c for example) and used for drive purposes.

For the same result, driving plus angle equalizing, a single torquemotor plus gears or belts may be used.

In any case, the simplicity and precision of the invention will be seen as advantageous in many ways, not the least of which is adaptability.

Figure 6:
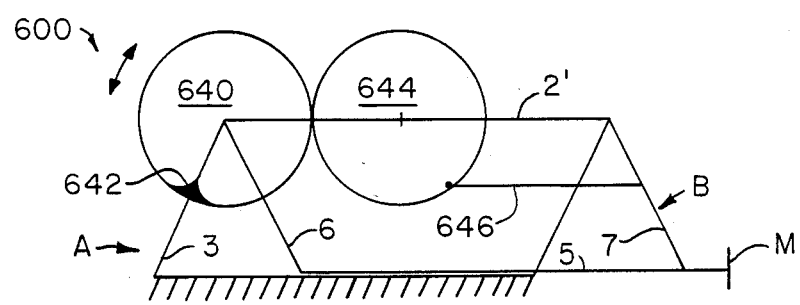
FIG. 6 is an elevational diagram of a gear coupling to synchronize operation of an embodiment of this invention.

FIG. 6 diagrams in embodiment 600 an example of direct gear coupling for angle equalization purposes. The parallelograms are at A and B. A first gear 640, rotatably mounted on bar 2' is at 642 coupled to side 3. A second gear 644, rotatably mounted on bar 2' engages gear 640, and through link 646 that is in parallelogram relation to bars 2', 7 and gear 644, rotates bar 7 in equal amount but opposite direction to bar 3, for operating the system to drive bar 5 in a rectilinear path.

In embodiment 600, gear 640 is shown centered at the vertex 3, 2', 6, but it need not be so centered, as gear 644 shows. Depending on the dimensions of the particular configuration, it may be convenient to mount both gears as gear 640 is mounted, or to mount both as 644 is mounted, or it may be desirable to mount one gear as 640 is mounted and to mount one gear as 644 is mounted. The arrow symbolizes any suitable drive.

Figure 6A:
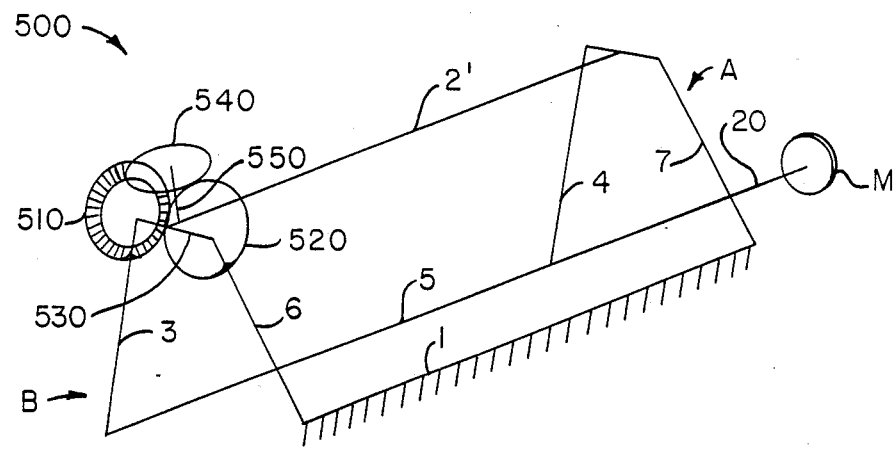
FIG. 6a is a second elevational diagram of a gear coupling to synchronize operation of an embodiment of this invention.

FIG. 6a diagrams embodiment 500, an example of differential gear coupling for angle equalization purposes. The parallelograms are at A and B. Co-axially disposed gears 510 and 520 are mounted rotatably on a pin 530 at the 3, 6, 2' vertex/juncture. One gear 510 is engaged rotationally with bar 3 and the other gear 520 with bar 6. Synchronous but opposite rotation of the gears and the bars 3, 6 is assured by idler gear 540 rotatably mounted on axle 550 whose lower base is rigidly mounted to bar 2'. The arrow symbolizes any suitable drive.

Figure 7:
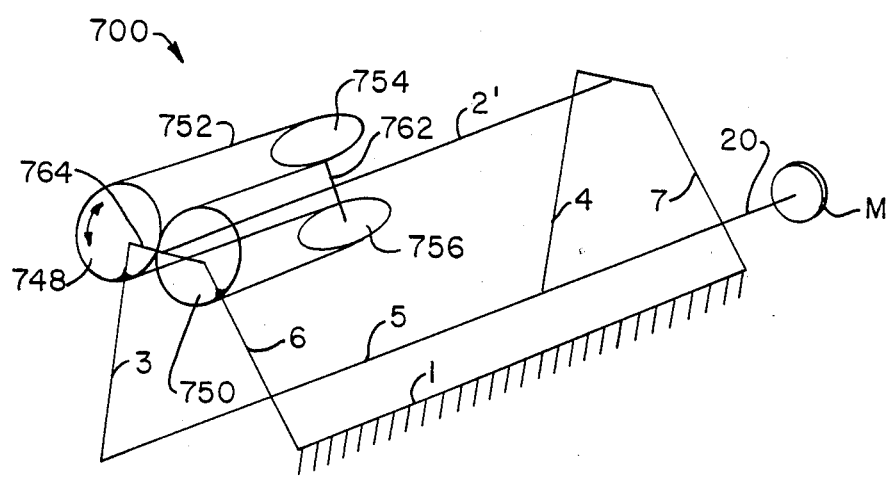
FIG. 7 is a perspective diagram of a coupling to synchronize operation of an embodiment of this invention.

FIG. 7 diagrams embodiment 700 in perspective view. Co-axially disposed gears 748 and 750 are mounted to rotate on a pin 764 at the 3, 6, 2' vertex/juncture. One gear 748 is engaged rotationally with bar 3 and the other, 750, with bar 6. Synchronous but opposite rotation of the gears and the bars 3, 6 is assured by an endless chain or belt 752 with end loops passed over respective idlers 754, 756 rotatively mounted on bar 2' by axle 762. The arrow symbolizes any suitable drive.

Figure 8:
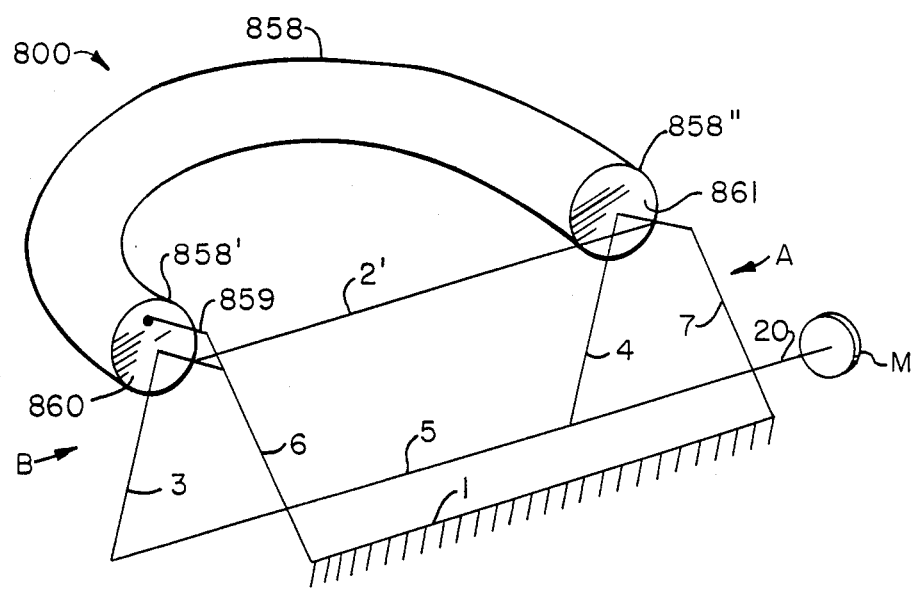
FIG. 8 is another perspective diagram of a coupling to synchronize operation of an embodiment of this invention.

FIG. 8 shows a zero backlash coupling embodiment 800. A flexible coupling 858 that may be of any length of metal bellows is arranged in a "U"-shaped half loop with the ends 858', 858" coaxially affixed to circular disks 860 and 861 mounted on hinge pins at 6, 2' and 4,2'. Disk 861 is rigidly attached to side 4. Disk 860 is rigidly attached to side 6 by a rigid linkage. The side 6 is extended past side 2'. A rod 859 is extended perpendicular to disk 860 so as to intersect the extension of side 6. Rod 859 is rigidly mounted both to the extension of side 6 and to the back of the disk 860. In this manner a coupling between sides 6 and 4 is achieved which assures that with respect to the common side 2' as rotation of primary side 6 will result in an equal but opposite rotation of the secondary side 4 and corresponding opposite senses of rotation by the primary side 7 and the secondary side 3.

Figure 9:
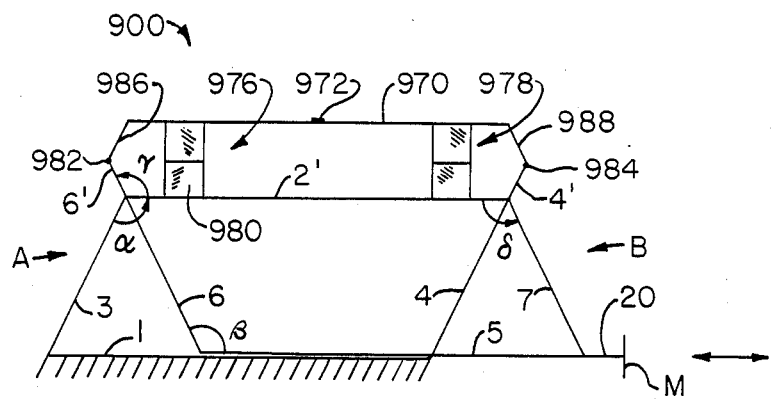
FIG. 9 is an idealized side elevational diagram of a further such embodiment.

FIG. 9 shows an embodiment 900 that, like the FIG. 8 embodiment, is substantially free of backlash.

The basic mechanism may be like that previously described, a dual parallelogram (A and B) linear motion system having sides 1, 2', 3, 4, 5, 6 and 7. In addition, for synchronizing angular motion, linkage is provided as follows.

Sides 6 and 4 respectively extend past the pivotal vertices 3, 6, 2' and 4, 7, 2', an equal distance, as continuations 6' and 4'. Connecting to 6' and 4' is a hexagon mechanism that includes a side or bar 970 that is of equal length with and is parallel-spaced above side 2', and is joined to extensions 6' and 4' by bars 986 and 988. Bar 986 extends from pivotal endpoint of 970 to pivot point 982; bar 988 extends from the other pivotal endpoint of 970 to pivot point 984; both as shown in FIG. 9. Points 982 and 984 are the endpoints of 6' and 4'. Bars 986 and 988 are both exactly equal to the length of 6'. Thus bars 2', 4', 988, 970, 986, 6' form the sides of a symmetric hexagon. Supporting the side 970 at all times parallel to 2' is at least one hinged hexagon mechanism having sides equal in length to bar 988. Two such supporting hexagon structures are shown in FIG. 9 as 976 and 978. Observe that the hexagon defined by 2', 4', 988, 970, 986, 6' and the support hexagon form a 3-dimensional hexagon "box" structure with preferably equal plates 980, hinged at or adjacent the vertices. The geometry is detailed in FIGS. 9a and 9b, not to scale. Hexagonal boxes as a type have been known and used in other applications. As indicated, one hexagon box may be used instead of two, and this simplification is used in the FIG. 9a and FIG. 9b descriptions. The bars may be plates for simplicity of exposition in these figures.

Figure 9A:
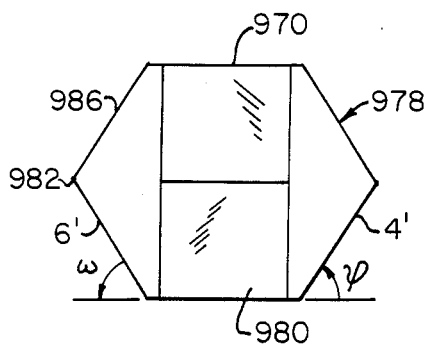
FIGS. 9a and 9b are perspective diagrammatic elevational and top plan view details of the FIG. 9 embodiment angle synchronization mechanism, exaggerated for exposition.
Figure 9B:
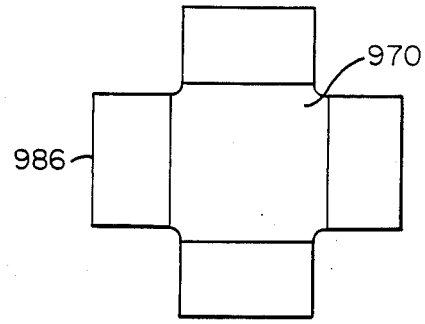

Note in FIG. 9a that $\omega = \phi$. By the geometric principle of equality of alternate interior angles, $\omega = \phi$ forces $\alpha = \delta$. (FIG. 9). Observe that if point 972 is the midpoint of 970 and if bars 6' and 4' are both extended past points 982 and 984, the extensions both to be equal to bar 6', then point 972 always remains midway between and colinear with the end points of these extensions to 4' and 6'. Thus point 972 may provide a useful place to mount drive apparatus.

In the FIG. 9 embodiment, the three dimensional hexagonal structure is located above 2', but it need not be; for example, it may be located below, but this arrangement may restrict travel.

Figure 10:
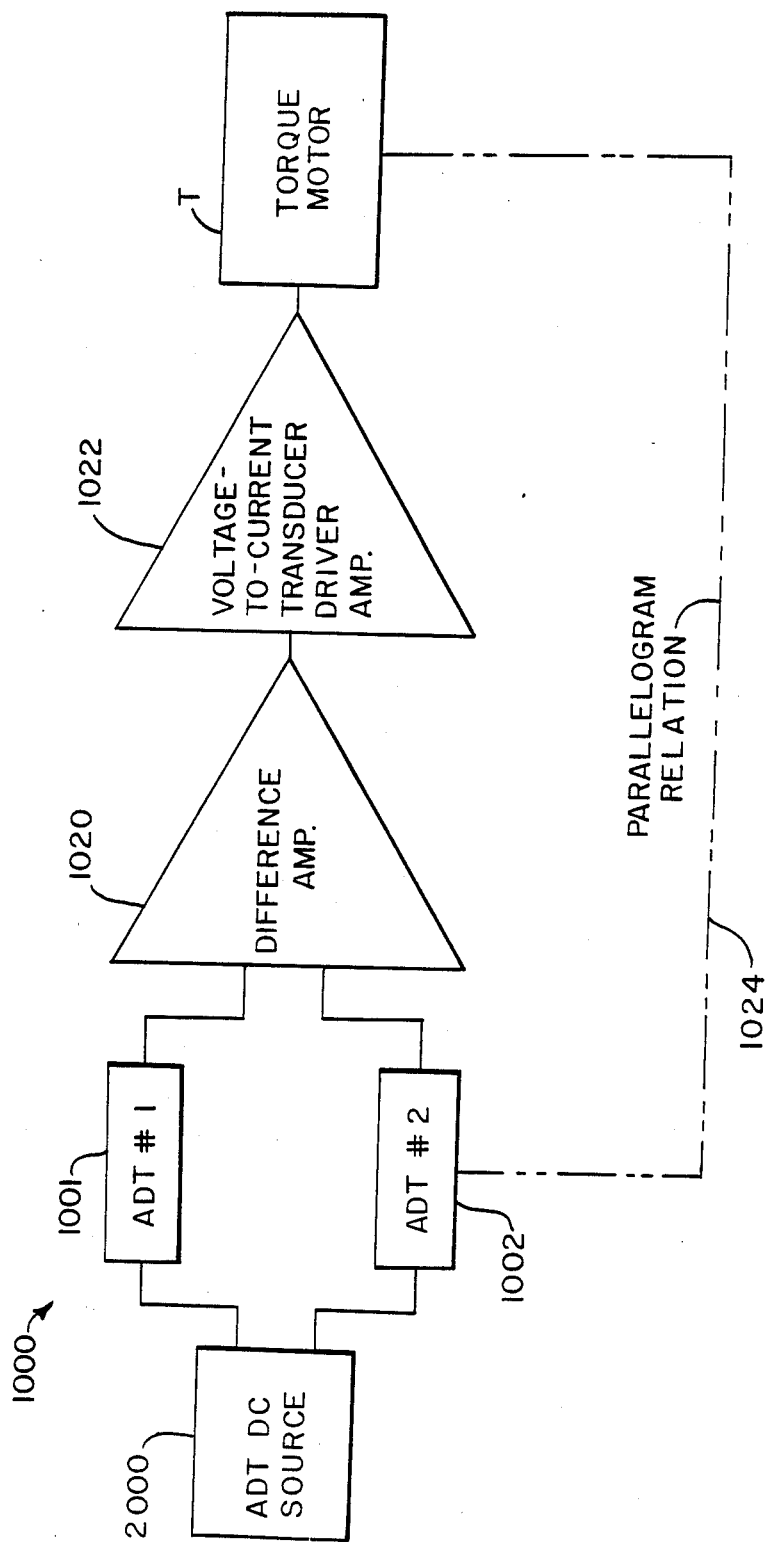
FIG. 10 is a circuit diagram.

FIG. 10 shows a suitable, conventional angle synchronization servo system.

OVERVIEW: Two Angular Displacement Transducers, ADT's 1001, 1002 will be used to monitor angles $\alpha$ and $\beta$; monitoring will be as noted through parallelogram relation. A Difference Amplifier 1020 will sense differences between the outputs of the two angular position transducers and convert each difference to a proportional signed voltage. This voltage will be directed to a voltage-to-current transducer driver amplifier 1022. The driver amplifier output wil be fed to a torque motor T stationed at angle $\alpha$. The torque motor will be poled so that it will turn the parallelogram A and angular position transducer monitoring in a direction which will reduce the difference between $\alpha$ and $\beta$. Thus the servo loop will slave the deformation of parallelogram A to that of parallelogram B. Power is supplied from a suitable DC source 2000.

DETAILED DESCRIPTION: The following three circuit elements will be mounted: One D.C. torque motor T at the 2', 3 vertex, mounting to be as described above in reference to FIG. 5 and two identical D.C. Angular Displacement Transducers (ADT's) mounted opposite each other, one at the 2', 7 vertex, the other at the 2', 4 vertex. Mounting of the ADT's will be similar to the torque motor mounting. ADT #1 will have its stator attached to 2', but its rotor will be attached to 7. ADT #2 will have its stator attached to 2' and its rotor will be attached to 4. Observe that ADT #1 and ADT #2 are reflections of each other on either side of central plane CP. This means that if bars 4 and 7 are rotated through angles of equal magnitude but opposite direction the outputs of both ADT's will increase (or decrease) by the same amount. The user will adjust the angular position of both ADT rotors so that both ADT outputs are the same when $\alpha = \beta$ and so the "Zero" reference occurs at the angular position appropriate for the particular ADT used.

The parallelogram relation is indicated through 1024.

Angular Displacement Transducer Series 600 is suitable for uses described herein and may be obtained from Trans-Tek, Incorporated, P.O.B. 338, Route 83, Ellington, Conn. 06029.

The invention described presents a mechanism which provides geometrically perfect straight line motion using only rotating elements, e.g. hinges, gears, levers, rotational force transmission coupling, torque motors and the like. However, the practical accuracy of the straight line motion is limited by the builders ability to space hinges correct distances apart. For this reason, where extremely accurate straight line motion is required, it may be necessary to mount the hinges in slight eccentrics to provide positional adjustment of the hinge. This is common practice in old art pivot carriages used as slides for Michelson interferometers.

The carriage linkage must comprise the dual parallelogram structure plus angle equalization means as described above. The linkage can be driven in a variety of ways. If the angle equalization means are mechanical, the linkage may be driven by a source of torque applied to any parallelogram vertex readily accessible. Or, the linkage may be driven by linear actuation applied axially to bar 5 or bar 2'. If the angle equalization means is a master/slave servo system as previously described, the source of torque or linear power must be applied to the master parallelogram structure.

In the description and claims where gears or chains are referred to it will be appreciated that equivalent means such as pulleys or sprockets and belts are included; further, where flex coupling, such as bellows coupling is referred to it is to be understood that equivalent means, such as universal joints, or speedometer type cabling are included; and that where differential gears are referred to, it is to be understood that equivalent means, such as planetary gears, are included. Certain specific means of mounting gears and connecting coupling have been used for purposes of exposition; it is to be understood that similar, known means of mounting or connecting which may be more desirable for specific applications do not depart from the spirit of the invention as described.

The terms "side in common" and "support" are intended as aids to exposition in the broadest sense and not as limitation.

It will be appreciated that all embodiments of the invention provide double the stroke length of the old art described.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A rotary system for constraining to a rectilinear movement a movement of an element such as a moving mirror of a Michelson interferometer, comprising:

a support;

first, second, third and fourth primary sides;

pivot means interconnecting said primary sides to form a first parallelogram with said first and second primary sides parallel and said third and fourth primary sides parallel and rotatable in-plane with respect to said second primary side;

means fixing said first primary side to said support;

first, second, third and fourth secondary sides;

pivot means interconnecting said secondary sides to form a second parallelogram with said first and second secondary sides parallel and said third and fourth secondary sides parallel and rotatable in-plane with respect to said secondary side; and said second secondary side fixed to said second primary side so as to maintain a fixed relative orientation therebetween;

a flexible constraining member having a first end connected to said first parallelogram and a second end connected to said second parallelogram, said flexible constraining member adapted to produce one sense of said in-plane rotation of said third and fourth secondary sides in response to an opposite sense of said in-plane rotation of said third and fourth primary sides; and drive means for producing said in-plane rotation of said third and fourth legs.

2. A rotary system according to claim 1 wherein said second primary side and said second secondary side constitute a single side common to both said first and second parallelograms.

* * * * *